United States Patent [19]

Blanchette

[11] Patent Number: 4,945,355
[45] Date of Patent: Jul. 31, 1990

[54] SYSTEM FOR COOPERATIVELY REASSIGNING DUTIES IN A MULTIPLE CONTROLLER ENVIRONMENT

[75] Inventor: Jeffrey J. Blanchette, Hoffman Estates, Ill.

[73] Assignee: Motorola, Inc., Schaumburg, Ill.

[21] Appl. No.: 263,447

[22] Filed: Oct. 27, 1988

[51] Int. Cl.$^5$ ............................ H04B 7/00; H04J 3/00
[52] U.S. Cl. .............................. 340/825.060; 370/85.8; 455/56
[58] Field of Search ................. 340/825.23, 825.05, 340/825.06; 370/60, 61, 85, 94, 95, 85.1, 85.8, 85.13, 94.1, 95.1; 379/204; 455/54, 56

[56] References Cited
U.S. PATENT DOCUMENTS

| | | |
|---|---|---|
| 4,161,786 | 7/1979 | Hopkins et al. ........................ 370/95 |
| 4,210,780 | 7/1980 | Hopkins et al. ........................ 370/85 |
| 4,251,865 | 2/1981 | Moore et al. .......................... 370/96 |
| 4,630,263 | 12/1986 | Townsend et al. .................... 370/90 |
| 4,698,629 | 10/1987 | Mori et al. ...................... 340/825.05 |

*Primary Examiner*—Donald J. Yusko
*Assistant Examiner*—Dervis Magistre
*Attorney, Agent, or Firm*—Timothy W. Markison; Joseph P. Krause; Steven G. Parmalee

[57] ABSTRACT

A radio communication system having the capability of providing acknowledgement messages to incoming messages while compensating for failed components that have the duty of acknowledging messages or redistributing the acknowledgment duties evenly among the components when there is a change in acknowledgment responsibilities. There is also disclosed a method for cooperatively reassigning certain tasks to certain users within a communication system.

4 Claims, 5 Drawing Sheets

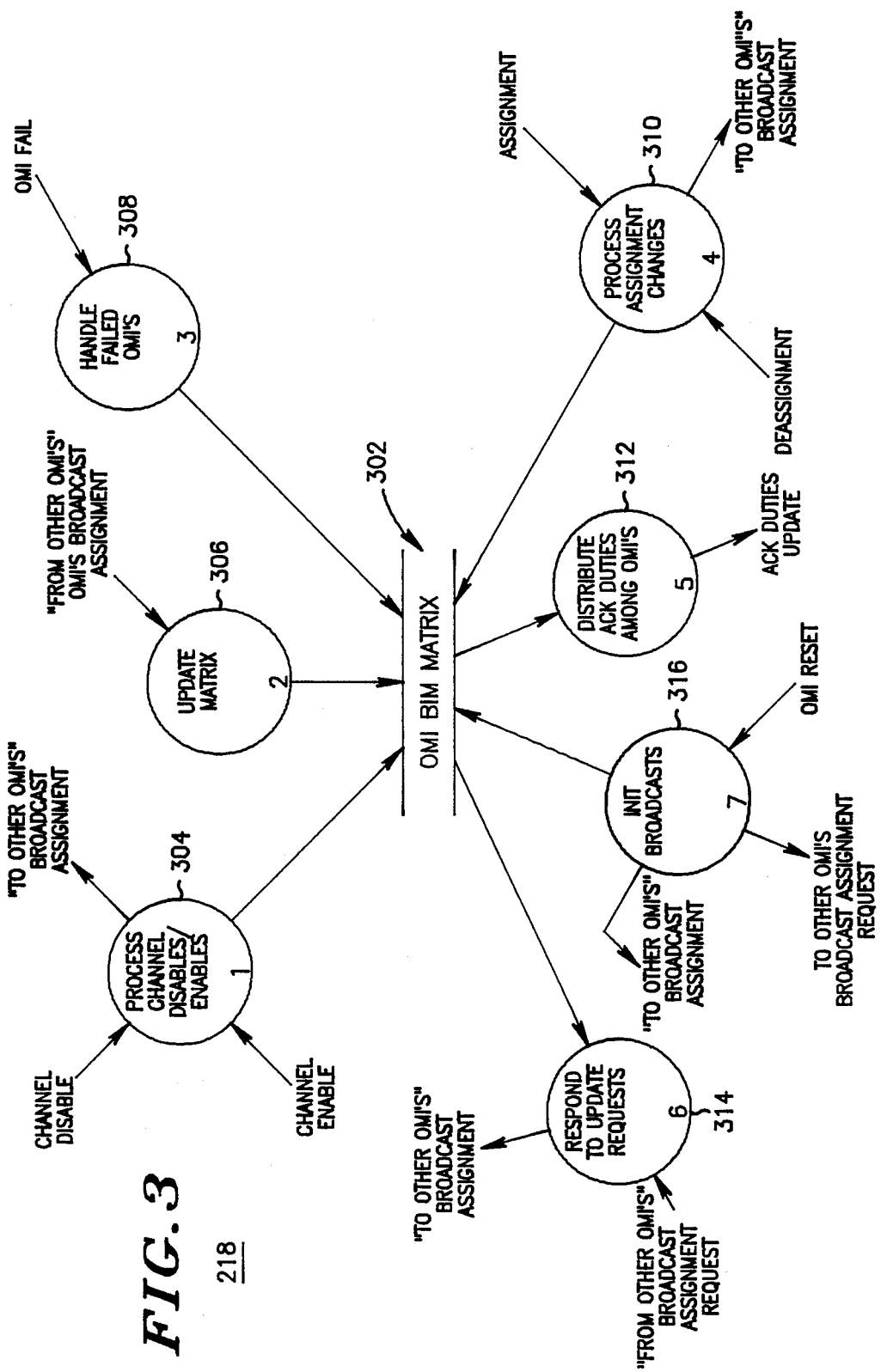

FIG. 5A

| (USER) OMIS | 1 | 2 | 3 | 4 | 5 | 6 | 7 | 8 |
|---|---|---|---|---|---|---|---|---|
| BIMS 1 | X | 0 | 0 | 0 | 0 | 0 | 0 | 0 |
| (TASK) 2 | X | X | 0 | X | 0 | X | X | 0 |
| 3 | X | 0 | 0 | X | 0 | 0 | 0 | 0 |
| 4 | X | 0 | 0 | X | X | 0 | 0 | 0 |
| 5 | X | X | 0 | 0 | 0 | X | 0 | X |
| 6 | X | 0 | 0 | 0 | X | 0 | 0 | 0 |
| 7 | X | X | 0 | 0 | 0 | 0 | 0 | 0 |

FIG. 5B

| (USER) OMIS | 1 | 2 | 3 | 4 | 5 | 6 | 7 | 8 |
|---|---|---|---|---|---|---|---|---|
| BIMS 1 | X<= | 0 | 0 | 0 | 0 | 0 | 0 | 0 |
| (TASK) 2 | X | X | 0 | X | 0 | X | X | 0 |
| 3 | X<= | 0 | 0 | X<= | 0 | 0 | 0 | 0 |
| 4 | X | 0 | 0 | X | X | 0 | 0 | 0 |
| 5 | X | X | 0 | 0 | 0 | X | 0 | X |
| 6 | X<= | 0 | 0 | 0 | X<= | 0 | 0 | 0 |
| 7 | X<= | X<= | 0 | 0 | 0 | 0 | 0 | 0 |
| DUTIES | 4 | 1 | 0 | 1 | 1 | 0 | 0 | 0 |

FIG. 5C

| (USER) OMIS | 1 | 2 | 3 | 4 | 5 | 6 | 7 | 8 |
|---|---|---|---|---|---|---|---|---|
| BIMS 1 | X<= | 0 | 0 | 0 | 0 | 0 | 0 | 0 |
| (TASK) 2 | X | X | 0 | X | 0 | X<= | X<= | 0 |
| 3 | X<= | 0 | 0 | X<= | 0 | 0 | 0 | 0 |
| 4 | X | 0 | 0 | X | X | 0 | 0 | 0 |
| 5 | X | X | 0 | 0 | 0 | X | 0 | X |
| 6 | X<= | 0 | 0 | 0 | X<= | 0 | 0 | 0 |
| 7 | X<= | X<= | 0 | 0 | 0 | 0 | 0 | 0 |
| DUTIES | 4 | 1 | 0 | 1 | 1 | 0/1 | 0/1 | 0 |

FIG. 5D

| (USER) OMIS | 1 | 2 | 3 | 4 | 5 | 6 | 7 | 8 |
|---|---|---|---|---|---|---|---|---|
| BIMS 1 | X<= | 0 | 0 | 0 | 0 | 0 | 0 | 0 |
| (TASK) 2 | X | X | 0 | X | 0 | X<= | X<= | 0 |
| 3 | X<= | 0 | 0 | X<= | 0 | 0 | 0 | 0 |
| 4 | X | 0 | 0 | X<= | X<= | 0 | 0 | 0 |
| 5 | X | X<= | 0 | 0 | 0 | X | 0 | X<= |
| 6 | X<= | 0 | 0 | 0 | X<= | 0 | 0 | 0 |
| 7 | X<= | X<= | 0 | 0 | 0 | 0 | 0 | 0 |
| DUTIES | 4 | 2 | 0 | 2 | 2 | 1 | 1 | 1 |

X = ASSIGNED    0 = UNASSIGNED    <= IS USED TO MARK BIM'S

SYSTEM FOR COOPERATIVELY REASSIGNING DUTIES IN A MULTIPLE CONTROLLER ENVIRONMENT

BACKGROUND ART

The present invention generally relates to a communication system that generally utilizes a series of base stations or repeaters to receive incoming signals which eventually are processed through a central electronics bank and then dispersed to several consoles that are to acknowledge such incoming signals.

Typically, in a communications system utilizing consoles that communicate with signals generated in the field, a base interface module (BIM) is assigned to a particular base station or repeater that interfaces with a communications channel that carries signals to and from subscribers out in the field. An operator multiplex interface (OMI) is normally assigned to a single console in the system and is also assigned to a particular BIM in order to allow the console to communicate with someone in the field through that particular BIM and repeater. The plurality of BIMs and OMIs are typically located within a central electronics bank (CEB) and communicate with each other through the use of a CEB data bus. Communication channels requiring acknowledgments are designated as RF signalling channels and use an RF signalling BIM as an interface.

Where a particular communication system has an automatic acknowledgment feature of some kind this feature normally requires that every message sent from a field unit or subscriber must be acknowledged by the fixed end equipment, such as one of the consoles. This procedure is simple when one fixed end unit exists since it acknowledges all received messages. However, problems start to occur when a system is used that utilizes a central electronics bank having several control consoles available for acknowledging incoming messages. Unless some cooperation exists between the consoles, all consoles will send acknowledgments at once. This method of operation tends to generate very uneven loading on the CEB data bus, consequently, overloading the modules on the data bus. The throughput capacity of the CEB data bus is much higher than the processing capabilities of the boards on the bus. If a large number of data packets is put onto the bus, microprocessors can become overburdened. With very large data bursts, the microprocessor loading is such that users notice a slow down in the console's response. Therefore, care must be taken in designing data protocols to prevent bursts of data.

Another problem that exists with the current method of acknowledging signals from the field is that overloading of one particular control console may occur. Currently in the CEB, there are instances in which a single control console performs an operation that may be shared with another console. The single console may be required to perform additional duties such as general fault maintenance for determining when to activate standby boards in the CEB. The existing approach assigns a single console to perform duties for all consoles. This approach works for a limited number of duties, but would overburden the one control console if applied in addition to acknowledgment responsibilities. The single console response time could degrade in a very busy system requiring a large number of acknowledgments for more than one communications channel.

Another problem that can exist with an acknowledgment system is that there may be a failure to acknowledge messages due to assignment changes in the system. Typically a control console is only allowed to acknowledge messages on channels that it is controlling or to which it is assigned. For a static system, the acknowledgment duties to be performed by each console can be determined at system set-up. The duties can be level loaded among the consoles and all channels can be assigned to a console that will handle acknowledgments for those channels. If, however, a console fails, its acknowledging duties will not be performed, hence the system stops functioning.

Therefore, a need exists for a method of reassigning the acknowledgment duties, within a communication system, to subscribers where failures or overloading occurs within the communication system.

SUMMARY OF THE INVENTION

It is an object of this invention to provide a method of reducing the number of duties to be performed by any one control console thereby level loading the acknowledgment duties among all the consoles.

It is another object of this invention to provide a system that reacts to changing assignments or failures in the system to ensure that all acknowledgment duties will be performed.

In this invention each OMI will broadcast its assignments to indicate which RF signalling BIMs it is controlling. Each OMI will then determine for which, if any, BIMs it will send acknowledgments. Whenever an OMI assignment changes, it will rebroadcast its new status, and then each OMI will again determine its duties. If an OMI fails, it is logged out of the CEB; the remaining OMIs then partition its duties. To ensure that the CEB is acknowledging messages during periods of transition (such as failure or reassignment of an OMI), two OMIs are selected to attempt to send acknowledgments (Ack) for each BIM since it takes some time to determine that an OMI has failed. Although two OMIs attempt to send an Ack, only one Ack is actually sent over the air. The second ack is prevented by the OMI and BIM interaction. On receipt of the data message, both OMIs try to key the BIM simultaneously; the BIM will only allow the one OMI to actually key (first-come-first-serve). The OMI that is allowed to key will follow through by sending an Ack; while the other OMI will stop trying to send an Ack. Each OMI performs a procedure to determine which OMIs acknowledge which messages from which BIMs. The procedure will then cause a distribution to occur of acknowledgment duties among the OMIs to ensure that each assigned BIM has an OMI responsible for its acknowledgments.

BRIEF DESCRIPTION OF THE DRAWINGS

FIG. 3 illustrates a data flow diagram of the acknowledgment distribution subsystem of the CEB.

FIGS. 5A–5D illustrate several tables that illustrate sequentially how the acknowledgment distribution procedure operates.

DETAILED DESCRIPTION OF THE PREFERRED EMBODIMENT

For a better understanding of the present invention together with other and further advantages and capabilities thereof, reference is made to the following disclosure and appended claims in connection with the above described drawings.

Figure 1:
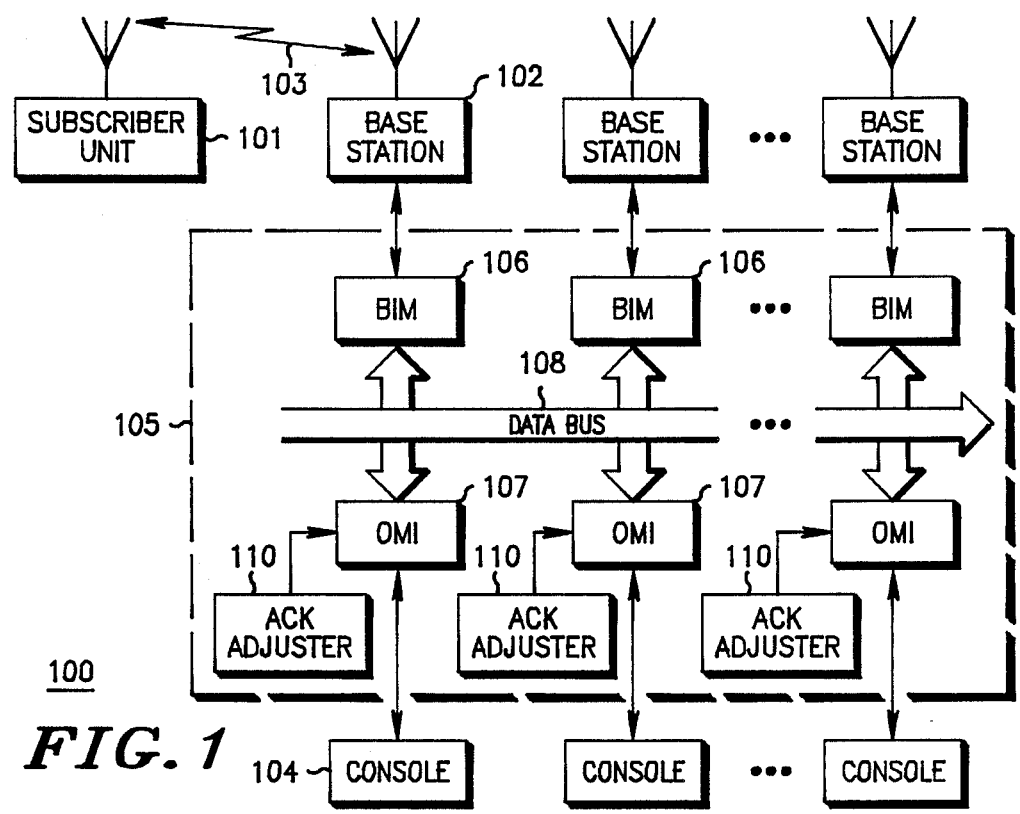
FIG. 1 illustrates a block diagram depiction of a radio communication system that includes the invention.

Referring now to FIG. 1, a radio communication system 100 is shown that includes generally one or more subscriber units (101), one or more base stations (102), one or more radio frequency communication channels (103), one or more consoles (104) and an improved central electronics bank (CEB) (105). Subscriber units (101) and base stations (102) can be comprised of any known and appropriate radio communication units. CEB (105) typically includes a base interface module (BIM) (106) and an operator multiplex interface (OMI) (107), BIM (106) providing an interface for base station (102) and OMI (107) providing an interface with console (104). In addition, BIM (106) and OMI (107) communicate with one another via a data bus (108). (Additional information regarding the general components of CEB (105) can be found in U.S. Pat. No. 4,603,418 entitled "Multiple Access Data Communication Controller For A Time Division Multiplex Bus", and in U.S. Pat. No. 4,630,263 entitled "Time Division Multiplex Communication Control System." Both of these documents are incorporated herein by reference).

CEB (105) further includes dynamic acknowledgment ("ACK") duty adjusters (110) that are coupled to each OMI (107) and serve to adjust or reassign OMI acknowledgment duties whenever a fault is detected or there is a change of assignments among the OMIs. Where a data message is received from one or more of subscriber units (101), CEB (105) must provide an acknowledgment message from one of consoles (104) before another message is received from one of the subscriber units. Duty adjusters (110) first determine which of the OMIs will respond to the data message. If a predetermined event, such as a failure of an OMI or a change of assignments, occurs and is detected then a redistribution of OMIs (107) duties for acknowledging certain data messages will occur. An acknowledgment message will then be sent by the appropriate OMI. Duty adjusters (110), in response to the event, proceed to determine the new ACK duties. Since the duty adjusters coupled to each OMI are substantially the same and are triggered by the same event, duty adjusters (110) should all arrive independently at the same result. The teachings of this invention will avoid the situations where one too many consoles, through their respective OMI, respond to one data message or where there is a failure to respond due to a failed OMI/console.

Figure 2:
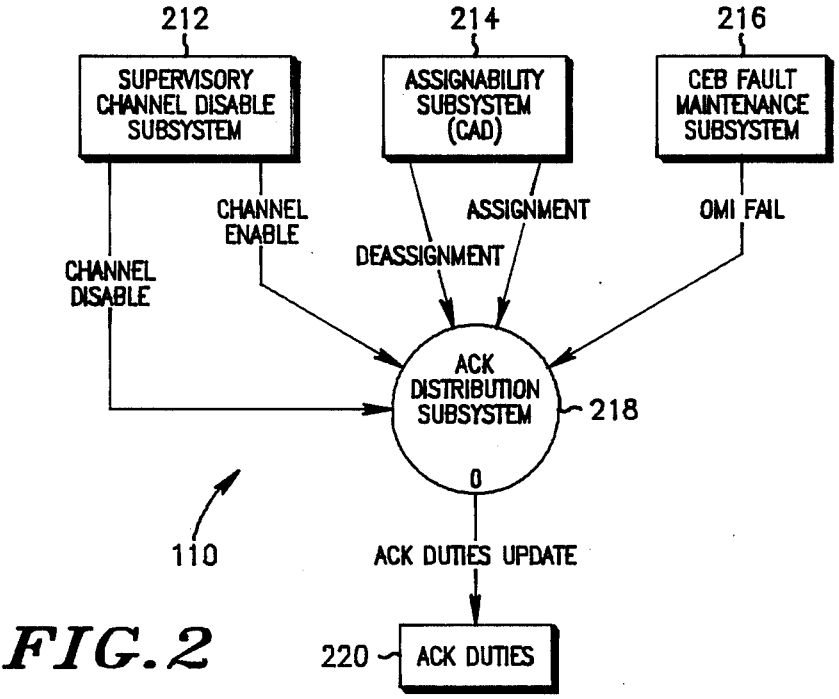
FIG. 2 illustrates a context diagram of the acknowledgment distribution system with its system interfaces.

Referring now to FIG. 2, there is illustrated a context diagram of ACK duty adjuster (110) that is comprised of a supervisory channel disable subsystem (SCDS) (212), an assignability subsystem (214), such as a computer aided dispatch, a CEB fault maintenance subsystem (216) and an acknowledgment distribution subsystem (218) that regularly updates the acknowledgment duties designated as (220), of the OMIs within the CEB. SCDS (212) serves as an input to acknowledgment subsystem (218) where operator desires access to certain channels in order to enable and disable certain OMIs during operation of the communication system. Assignability subsystem (214) sends out assignment and de-assignment inputs to acknowledgment subsystem (218) that affect the acknowledgment duties of other OMIs within the CEB. Fault maintenance subsystem (216) informs acknowledgment subsystem (218) of failures of any OMIs within the CEB. Acknowledgment subsystem (218) processes all of these incoming inputs by executing an algorithm that will automatically update and reassign acknowledgment duties among the OMIs, thereby affecting the acknowledgments required by the consoles in the communication system.

Referring now to FIG. 3, there is illustrated a data flow diagram of acknowledgment distribution subsystem (218). Subsystem (218) includes an OMI-BIM matrix (302), a process channel disable/enable (304), OMI matrix updater (306), failed OMI disabler (308), assignment change processor (310), an acknowledgment distribution algorithm (312), update responder (314) and broadcast initializer (316). In particular, OMI-BIM matrix (302) is a memory store that is comprised of a matrix of OMI and BIM positions, that is capable of storing information with respect to which OMIs (corresponding to a particular console) control which BIMs in the system. The matrix is programmed at the time the system is set up. As illustrated, matrix (302) is of a dynamic nature since it has all of the other inputs that continuously affect its contents while the system is operating.

Process channel disable/enable (304) is responsible for reacting to enabled and disabled communication channels. The channels are enabled/disabled by SCDS (212) and are reported to process channel (304). When a channel is disabled, calls on that channel are no longer presented on the console operator's position. If calls are not presented, then the OMI cannot send acknowledgments on that channel. When a "channel disable" (or "channel enable") flow is received indicating that a channel is now disabled or enabled, process channel (304) will update its entry in matrix (302). Process channel (304) will also generate a broadcast assignment signal that will flow through the CEB data bus to update all other OMIs in matrix (302). Matrix updater (306) updates matrix (302) according to broadcast assignments that are received from other OMIs through other subsystems. When an "other OMI broadcasts assignments" flow is received, matrix updater (306) will update the other OMIs entry in matrix (302) with the assignments indicated in the flow.

Further included in subsystem (218) is a failed OMI disabler (308), which manages failed OMIs in the CEB. The failed OMIs are detected by existing CEB fault maintenance subsystem (216) and are reported to disabler (308). When an "OMI fail" flow is received (indicating that an OMI has failed), disabler (308) will clear that failed OMI's entry in matrix (302). This action indicates that the failed OMI can no longer perform acknowledgment duties for any of the channels.

In subsystem (218), assignment change processor (310) reacts to changes in the OMI's channel assignments. The assignment changes are made by assignability subsystem (214) and are reported to processor (310). An "assignment" flow indicates that a new channel is being assigned to the OMI and a "de-assignment" indicates that a channel assignment is being taken away. When processor (310) receives an assignment or de-assignment flow, it will update its entry in matrix (302) and will then generate a broadcast assignment flow to update all other OMIs in matrix (302).

Within each OMI resides the acknowledgment distribution subsystem (312) that distributes the CEB's acknowledgment duties among the OMIs. Subsystem (312) is effected whenever matrix (302) is modified and will determine which OMIs should perform acknowledgment duties for which BIMs; the result of which is stored in an ACK duties store. Matrix (302) indicates which BIMs are assigned to each OMI. Subsystem (312) will attempt to assign two OMIs to each BIM—the second OMI performs when the first fails—and will attempt to evenly distribute the acknowledgment duties among the OMIs.

As further illustrated in FIG. 3, subsystem (218) also includes an update responder (314) that responds when other OMIs request current assignment status. If another OMI is requesting an update then responder (314) will read this OMI's entry in matrix (302) and will broadcast the assignment to other OMIs. In subsystem (218), broadcast initializer (316) is responsible for initiating the OMI assignment broadcast when an OMI initially powers up or is reset. Upon power up or reset, the generation of a broadcast assignment request flow is triggered. This flow will be sent to other OMIs to request updates to current assignments. At power up or reset, each OMI will broadcast its assignments to indicate which RF signalling BIMs it is controlling. Each OMI will then determine for which, if any, BIMs it will send acknowledgments. Whenever an OMIs assignment changes, it will rebroadcast its new status, then each OMI will again determine its duties. If an OMI fails, it is "logged out" of the CEB; the remaining OMIs then partition its duties.

Figure 4A:
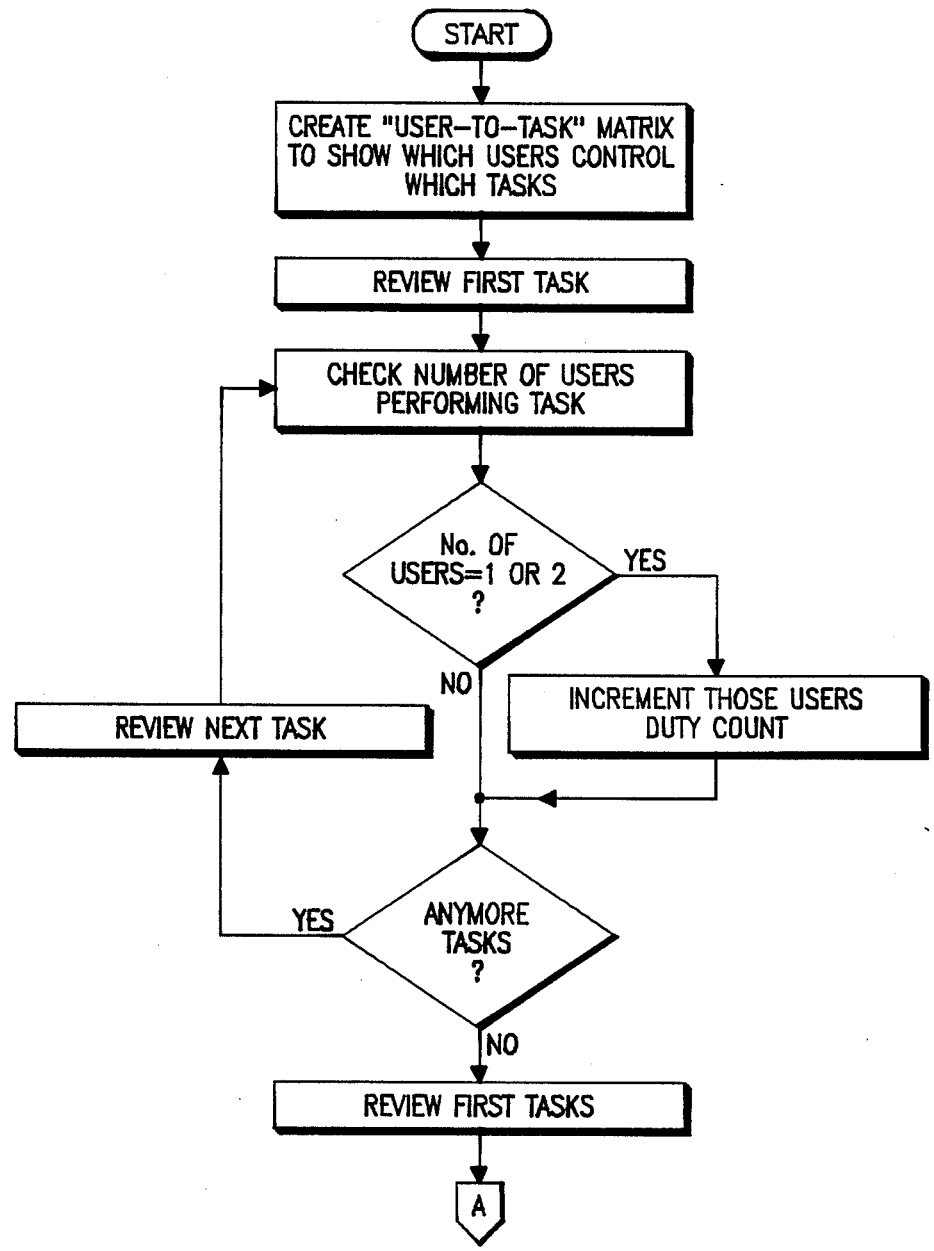
FIGS. 4A and 4B illustrate a flow chart of the operation of the acknowledgment distribution procedure.
Figure 4B:
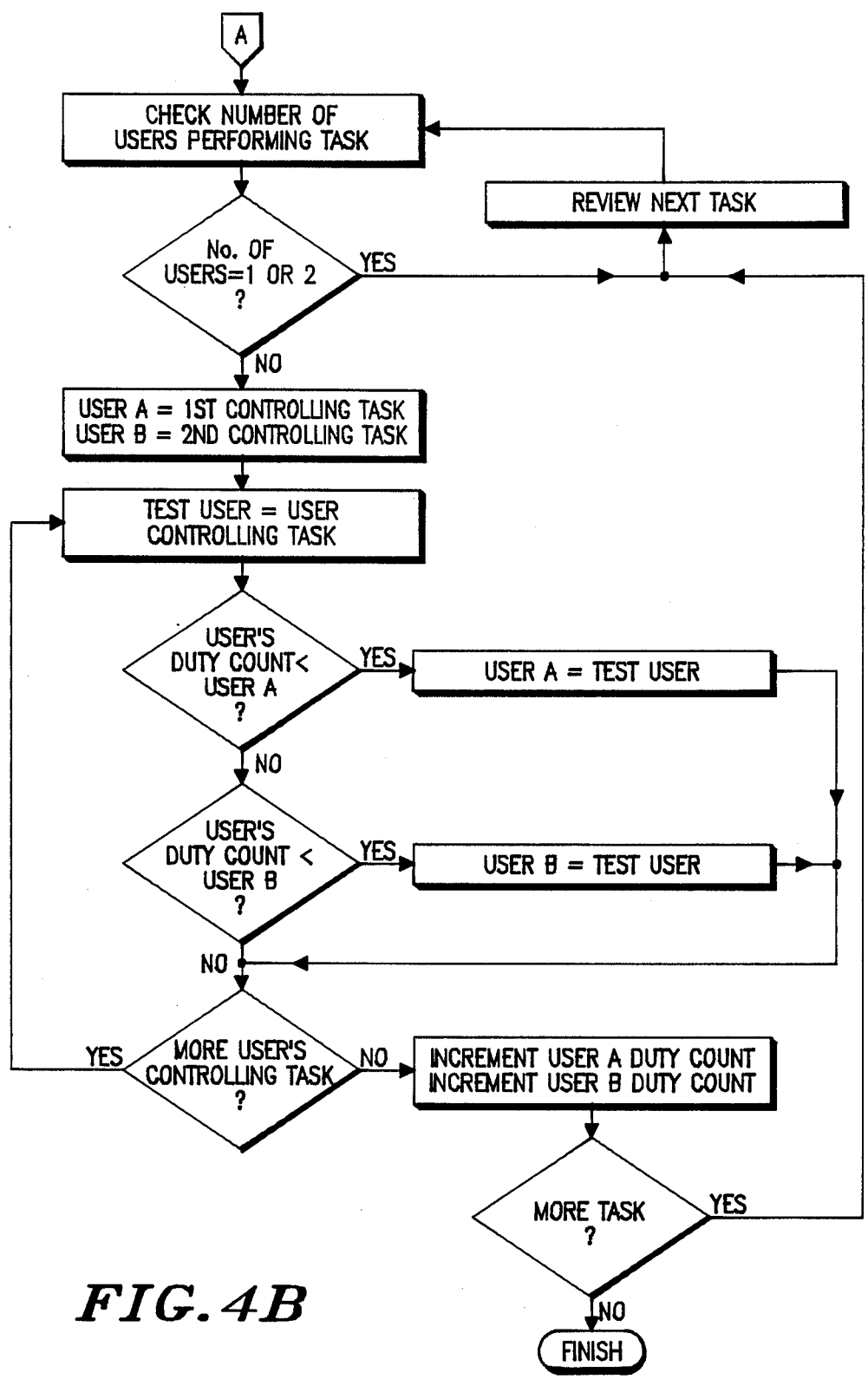

Referring now to the flow charts of FIGS. 4A and 4B and the tables of FIGS. 5A–5D for assistance in describing the operation of the distribution subsystem (312). In general, the method of cooperatively reassigning certain tasks (or BIMs) to certain users (or OMIs) in a communication system is as follows. A predetermined event is first detected by one of the users. Next, user assignments are then redistributed for some of the tasks among some of the users and the redistribution is accepted.

Referring now to FIG. 5A, a discussion will follow on the manner in which the distribution subsystem (312) operates. Given that it is desirable to have two OMIs (users) assigned to each BIM (task) a matrix is created with BIMs on one axis and OMIs on the other axis. The matrix indicates which OMIs are assigned ("X"=assigned, "0"=unassigned) to which BIMs at either the time of power up or reset. Where a BIM is assigned to more than one OMI, all of those OMIs will have the responsibility of acknowledging messages coming through that BIM.

Referring now to FIG. 5B, the next step in the process is to review the matrix and for each BIM mark those assigned to one or two OMIs. Under each OMI determine the number of acknowledgment duties by summing up the number of marked BIMs. In the following step, referring to FIG. 5C, starting with the first BIM not being acknowledged, the duty of acknowledging for this BIM is assigned to the OMIs with the smallest loads. The loading numbers are then updated at the bottom of the matrix. This step is repeated for the remaining BIMs in the matrix until a viable distribution of acknowledgment duties among the OMIs is established, as seen in FIG. 5D. Although the distribution is not equal, the duties to be performed by the OMIs are distributed as evenly as possible. After the subsystem is executed the acknowledgment duties are updated among the different levels in the CEB through subsystem (218) shown in FIG. 3.

The subsystem described may be effected through the use of software to report changes in assignments or report OMI failures in order to keep all OMIs synchronized. The teachings of the present invention can be used to cooperatively distribute the acknowledgment duties among the OMIs and RF signalling systems that use consoles to communicate with the field units. The teachings of the present invention may also be used to enhance existing features in any system to improve status reporting within the system.

The use of the present invention can also break up the work load per RF signalling channel. Past approaches allocated all duties for all channels to one OMI without regard to that particular OMI's assignments. The method disclosed herein ensures that duties for a given channel are performed by the appropriate OMI assigned to that channel. With the teachings of the present invention it is also possible to respond efficiently to changed assignments in the CEB and redistribute duties appropriately. Similar approaches fix the duties at the time of system installation, however those duties are not allowed to vary with changes in channel assignments. With the present invention, responsibilities tied to assignments can be managed effectively, especially where the channel assignments are dynamic.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a communication system having a plurality of subscriber units, a plurality of base stations, a plurality of radio frequency communication channels, a plurality of consoles, a central electronics bank that consists of a plurality of base interface modules, a plurality of operator multiplex interface modules, and a data bus, wherein the central electronics bank, via the plurality of operator multiplex interface modules and the plurality of base interface modules, operably couples the plurality of radio frequency communication channels to the plurality of consoles, a method for cooperatively executing and reassigning acknowledgement assignments comprising the steps of;
    (a) receiving, by a base interface module of the plurality of base interface modules, a data message transmitted by a subscriber unit of the plurality of subscriber units to produce a received data message;
    (b) generating, for the received data message, an acknowledgement signal by each of a predetermined number of operator multiplex interface modules of the plurality of operator multiplex interface modules to produce generated acknowledgement signals, where the predetermined number of operator multiplex interface modules have acknowledgement assignments for data messages received by the base interface module of step (a);
    (c) transmitting, by the base interface module of step (a), one of the generated acknowledgement signals to the subscriber unit of step (a); and
    (d) reassigning acknowledgement assignments for at least one of the plurality of operator multiplex interface modules whenever the central electronics bank detects a predetermined event.

2. The method according to claim 1 wherein step (d) further comprises reassigning acknowledgement assignments for at least one of the plurality of operator multiplex modules whenever the central electronics bank detects a predetermined event, where the predetermined event comprises an oerpator multiplex interface module failure, changing which of the plurality of radio frequency communication channels a console of the plurality of consoles is monitoring, or reassignment by a computer aided dispatcher.

3. In a communication system having a plurality of subscriber units, a plurality of base stations, a plurality of radio frequency communication channels, a plurality of consoles, a central electronics bank that consists of a plurality of base interface modules, a plurality of operator multiplex interface modules, and a data bus wherein the central electronics bank is improved to comprise;

ACK duty adjuster means, operably associated with the plurality of operator multiplex interface modules, for monitoring and updating acknowledgement assignments for the plurality of operator multiplex interface modules, the ACK duty adjuster means comprises;

OMI-BIM matrix means for storing the acknowledgement assignments, wherein each of the plurality of base interface modules has a predetermined number of operator multiplex interface modules of the plurality of operator multiplex interface modules assigned to perform acknowledgement duties for data messages received by the each of the plurality of base interface modules;

updating means, operably associated with the OMI-BIM matrix means, for updating the acknowledgement assignments stored in the OMI-BIM matrix means whenever the central electronics bank detects a predetermined event; and distribution means, operably associated with the OMI-BIM matrix means and the updating means, for determining which of the plurality of operator multiplex interface modules will be assigned the acknowledgement duties for each of the base interface modules when the predetermined event is detected, such that acknowledgement duties are distributed among the plurality of operator multiplex interface modules.

4. The improved central electronics bank of claim 3 wherein the ACK duty adjuster means further comprises;

enabling/disabling means, operably associated with the updating means, for detecting enablement or disablement of operator multiplex interface modules and for generating the predetermined event that indicates enablement or disablement of an operator multiplex interface module of the plurality of operator multiplex interface modules; and failure detection means, operably associated with the updating means, for detecting operator multiplex interface module failures and for generating the predetermined event that indicates a particular operator multiplex interface module failed.

* * * * *